United States Patent [19]

Ono

[11] Patent Number: 4,648,205
[45] Date of Patent: Mar. 10, 1987

[54] CONSTRUCTION OF DOOR GLASS GUIDE IN MOTOR VEHICLE

[75] Inventor: Kenzi Ono, Toyota, Japan

[73] Assignee: Toyota Jidosha Kabushiki Kaisha, Toyota, Japan

[21] Appl. No.: 717,686

[22] Filed: Mar. 29, 1985

[30] Foreign Application Priority Data

Apr. 12, 1984 [JP] Japan ............................ 59-54031[U]

[51] Int. Cl.⁴ .............................................. E05F 11/38
[52] U.S. Cl. ......................................... 49/374; 49/502
[58] Field of Search ................. 49/440, 374, 376, 502, 49/348

[56] References Cited

U.S. PATENT DOCUMENTS

| | | | |
|---|---|---|---|
| 4,069,617 | 1/1978 | Koike | 49/440 X |
| 4,240,227 | 12/1980 | Hasler et al. | 49/440 X |
| 4,483,100 | 11/1984 | Blankenburg et al. | 49/374 X |
| 4,494,337 | 1/1985 | Watanabe et al. | 49/374 |
| 4,503,639 | 3/1985 | Rossie et al. | 49/374 |

*Primary Examiner*—Philip C. Kannan
*Attorney, Agent, or Firm*—Finnegan, Henderson, Farabow, Garrett & Dunner

[57] ABSTRACT

A construction of a door glass guide in a motor vehicle, wherein a door glass of a three-dimensional curved surface is vertically movably guided, slide members each having a spherical head portion being shifted into a compartment are mounted at least at upper end portions of front and rear end edges of the door glass;

a pair of front and rear guide channel portions are provided on a door frame, the guide channel portions having curvatures substantially equal to respective curvatures of the front and rear end edges of the door glass in the longitudinal section thereof, for vertically, slidably guiding the slide members.

20 Claims, 6 Drawing Figures

CONSTRUCTION OF DOOR GLASS GUIDE IN MOTOR VEHICLE

BACKGROUND OF THE INVENTION

1. Field of the Invention

This invention relates to a construction of a door glass guide in a motor vehicle, and more particularly, to improvements in a construction of a door glass guide in a so-called flush-surfaced motor vehicle, wherein slide members mounted at positions shifted inwardly from the door glass are vertically and slidably guided by guide grooves provided inwardly of the door glass, so that the outer surface of the door glass is made substantially flush with the outer surfaces of a door frame and a vehicle body.

2. Description of the Prior Art

There are so-called surface-flush motor vehicle, wherein the outer surface of the vehicle body including a door glass, door frame and the like is flushed up for the purposes of reducing an air resistance and wind whistle during running of the motor vehicle at high speed and improving the design of appearance of the motor vehicle.

Since the door glass is subjected to a force of sucking the door glass outwardly due to a difference in pressure between the interior and the exterior of a compartment during running of the motor vehicle at high speed, the door glass should be restrained to control this outward displacement.

As shown in West German Patent Publication No. 2,809,721 for example, to attain both purposes of the above-described flush-surfacing and the prevention of the outward displacement of the door glass, slide members are mounted at front and rear end edges of the door glass, projecting into the compartment, and there slide members are vertically, slidably guided by guide grooves formed in the door frame disposed inwardly of the door glass, so that the outer surface of the door frame is not bulged out from the outer surface of the door glass.

As a matter of course, the guide groove in the door frame should be formed along a moving path of the door glass in the vertical direction.

Now, there are motor vehicles, wherein the outer surfaces of the vehicle body is formed into a three-dimensional curved surface for the purposes of the reduction of an air resistance during running of the motor vehicles at high speed, improvements in characteristics of aerodynamics and betterment of the design of appearance.

In these motor vehicles having the outer surface of the three-dimensional curved surface, as a matter of course, the door glass should be of the three-dimensional curved surface.

The slide members are mounted to the inner surface of this door glass formed into the three-dimensional curved surface being shifted inwardly from the door glass, and, when the door glass is to be guided by the guide grooves at the inner side of the door glass in the opening or closing direction, radii of curvature of the door glass at the front and rear end portions thereof in the longitudinal section are considerably different, whereby it is impossible to guide the door glass along the sectional curves of the door glass in the vertical direction.

In consequence, there have heretofore been adopted such arrangements that plays of guide grooves are made large for the slide members and only each one portion of the front and rear end edges of the door glass are guided by the guide grooves.

Because of this, the door glass of the prior art has suffered the disadvantage that it is difficult for the door glass to make smooth movement in the vertical direction and the door glass has the so-called looseness in the direction of thickness thereof during the vertical movement.

SUMMARY OF THE INVENTION

It is therefore the primary object of the present invention to provide a construction of a door glass guide in a motor vehicle, wherein a door glass of a three-dimensional curved surface can be guided in the vertical direction smoothly and without the looseness in the direction of thickness thereof.

To this end, the present invention contemplates that, in a construction of a door glass guide in a motor vehicle, wherein the door glass of a three-dimensional curved surface is vertically movably guided, slide members each having a spherical head portion shifted into a compartment are mounted at least at upper end positions of front and rear end edges of the door glass, and a pair of front and rear guide channel portions are provided on a door frame, the guide channel portions having curvatures of the front and rear end edges of the door glass in the longitudinal section thereof, for vertically, slidably guiding the slide members, so that the door glass can be inclined in the lateral direction in a horizontal plane during the vertical movement of the door glass.

To the above end, the present invention contemplates that said slide members are provided with a mounting seat coming into contact with the inner surface of the door glass when the slide member is tightened and fixed to the door glass, said spherical head portion and a connecting shaft portion for connecting the spherical head portion to the mounting seat.

To the above end, the present invention contemplates that each of said guide channel portions has such a sectional form that a generally elliptic guide groove elongate in cross section, for incorporating therein the spherical head portion of the slide member and restraining the same in the direction of the thickness of the door glass.

To the above end, the present invention contemplates that an opening of the guide groove is penetrated therethrough with the connecting shaft portion of the slide member, and has a width permitting the slide member to rock about the spherical head portion in the cross section of the guide channel portion within a predetermined range.

To the above end, the present invention contemplates that said spherical head portion of the slide member is projected inwardly from the door glass, and said guide groove of the guide channel portion is opened outwardly in the widthwise direction of the vehicle body.

To the above end, the present invention contemplates that said connecting shaft portion of the slide member is perpendicularly bent along the inner surface of the door glass, said spherical head portion is mounted to the forward end of the connecting shaft portion, and the guide channel portion is opposed to this spherical head portion.

To the above end, the present invention contemplates that one slide member is mounted to a position close to the upper end of the forward end edge of the door glass and a pair of slide members are mounted to the upper and lower ends of the rear end edge of the door glass, respectively.

DETAILED DESCRIPTION OF THE PREFERRED EMBODIMENT

Description will hereunder be given of one embodiment of the present invention with reference to the drawings.

As shown in FIGS. 1 to 4, according to this embodiment, in a construction of a door glass guide in a motor vehicle, wherein a door glass 10 of a three-dimensional curved surface is vertically movably guided, slide members 14 each having a spherical head portion 14C shifted into a compartment 12 are mounted at an upper end position of a front end edge 10A of the door glass 10 and at upper and lower end positions of a rear end edge 10B of the door glass 10 and a pair of guide channel portions 18A and 18B are provided on a door frame 16, the guide channel portions 18A and 18B having curvatures substantially equal to respective curvatures of the front and rear end edges 10A and 10B of the door glass 10 in the longitudinal section thereof, for vertically guiding the slide members 14.

Figure 1:
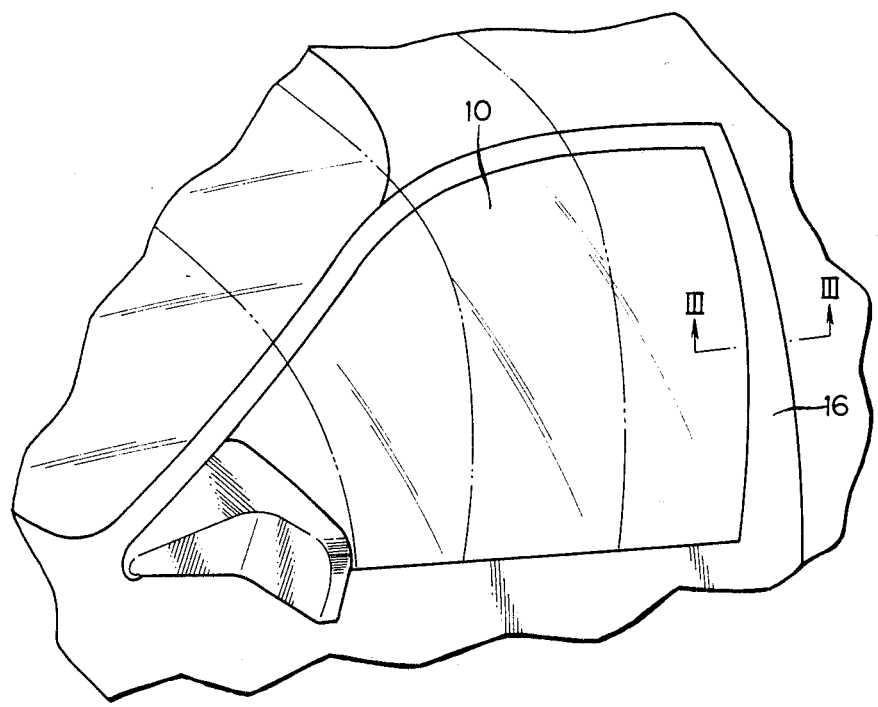
FIG. 1 is perspective view showing the side door in a motor vehicle, to which is applied the present invention.
Figure 2:
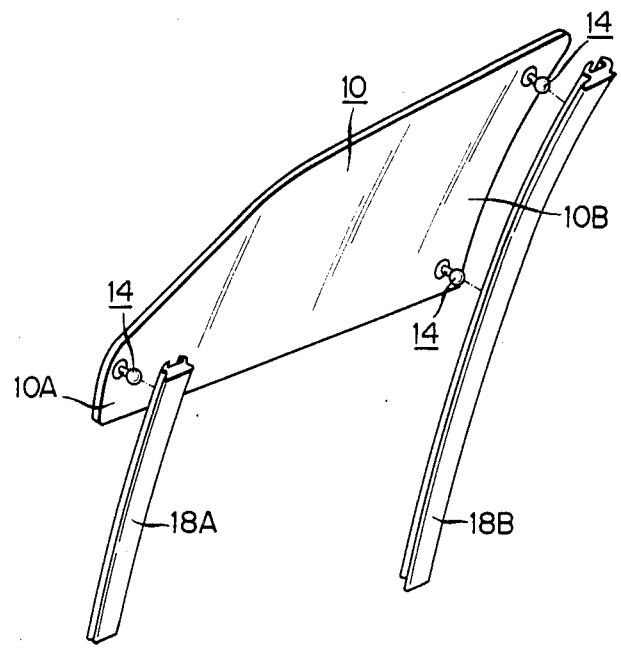
FIG. 2 is a disassembled perspective view showing an embodiment of the construction of the door glass guide in a motor vehicle according to the present invention.
Figure 3:
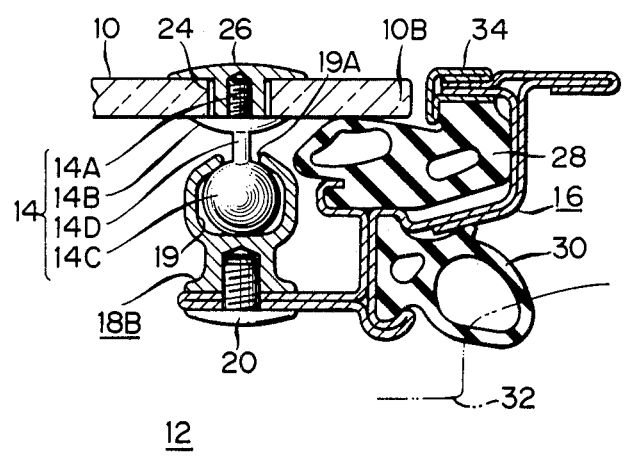
FIG. 3 is an enlarged sectional view taken along the line III—III in FIG. 1.
Figure 4:
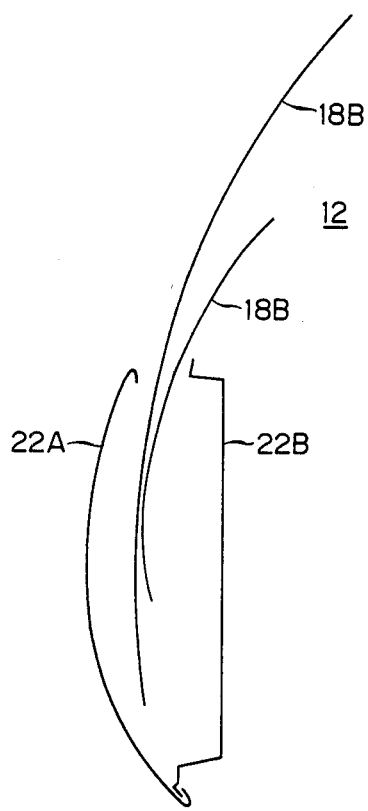
FIG. 4 is a schematic sectional view showing the guiding center axes of a pair of front and rear guide channel portions in the above embodiment.

As shown in FIGS. 3 and 4, the guide channel portions 18A and 18B are tightened and fixed through bolts 20 to the door frame 16 at suitable positions in the vertical direction, and incorporated in a space formed between a door outer panel 22A and a door inner panel 22B along a moving path of the door glass 10.

Each of the slide members 14 has an externally threaded portion 14A, which is threadably coupled from inside of the door glass 10 to a nut 26 inserted from outside through a through-hole 24 formed in the door glass 10, whereby the slide member 14 is tightened and fixed to the door glass 10.

In the drawing, designated as 14B is a mounting seat coming into contact with the inner surface of the door glass 10 when the slide member 14 is tightened and fixed to the door glass 10; and spherical head portion 14C is vertically, slidably coupled into the guide channel portion 18A or 18B, and a connecting shaft portion 14D for connecting the spherical head portion to the mounting seat.

The guide channel portion 18A or 18B has such a cross-sectional form of a generally elliptic guide groove that is elongated, for incorporating therein the spherical head portion 14C of the slide member 14 and restraining the same in the transverse direction or direction of the thickness of the door glass.

An opening 19A of this guide groove 19 is penetrated therethrough with the connecting shaft portion 14D of the slide member 14, and has a width permitting the slide member 14 to rock about the spherical head portion 14C in the cross section of the guide channel portion 18A or 18B within a predetermined range.

In the FIG. 3, designated at 28 is a door glass weather strip for sealing a space formed between the door frame 16 and the door glass 10, and 30 is a door weather strip, which comes into contact with the door and a center pillar 32, a roofside rail and a front pillar (the latter two members are not shown) on the side of vehicle body, for sealing a space formed between the door and the vehicle body when the door is closed, and 34 a door molding.

Figure 5:
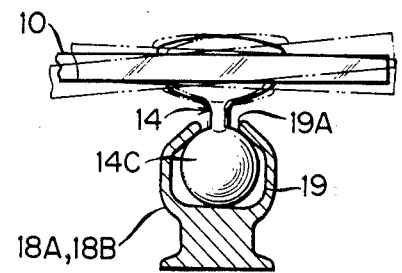
FIG. 5 is a sectional view showing action of the slide member in the above embodiment.
Figure 6:
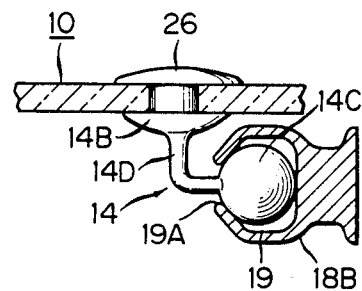
FIG. 6 is a sectional view showing a main part of a second embodiment of the present invention.

In this embodiment, even if the difference in radius of curvature between the guide channel portions 18A and 18B is large during the vertical movement of the door glass 10, the spherical head portion 14C of the slide member 14 guided by the guide groove 19 can rock about the spherical head portion 14C in the guide groove 19 in a horizontal plane within a predetermined range as shown in FIG. 5, so that a difference in displacement in the widthwise direction between the front and rear end edges 0A and 10B can be absorbed, thereby enabling to vertically guide the door glass 10 smoothly and without the looseness.

Additionally, in the above embodiment, the spherical head portion 14C of the slide member 14 is projected inwardly from the door glass 10, while, the guide groove 19 of the guide channel portion 18A or 18B is opened outwardly in the widthwise direction of the vehicle body; however, the present invention need not necessarily be limited to this embodiment, and any arrangement may be adopted in which only if the spherical head portion 14C is shifted from the inner surface of the door glass 10 into the compartment 12 and the guide channel portion 18A or 18B can rockingly hold the spherical head portion 14C in a horizontal plane within a predetermined range. In consequence, for example, such an arrangement may be adopted that the connecting shaft portion 14D of the slide member 14 is perpendicularly bent along the inner surface of the door glass 10, the spherical head portion 14C is mounted to the forward end of the connecting shaft portion 14D, and the guide channel portion 18A or 18B is opposed to this spherical head portion 14C.

Furthermore, in the above embodiment, one slide member 14 is mounted to a position close to the upper end of the forward end edge 10A of the door glass 10 and a pair of slide members 14 are mounted to the upper and lower ends of the rear end edge 10B of the door glass 10; respectively, however, at least each one slide member 14 may be mounted to the forward end edge 14A and the rear end edge 14B, respectively.

What is claimed is:

1. A construction of a door glass guide in a motor vehicle, wherein a door glass of a three-dimensional curved surface is vertically movably guided, comprising:

slide members each having a spherical head portion and being mounted at least at upper end portions of front and rear end edges of the door glass;

a pair of front and rear guide channel portions provided on a door frame vertically, slidably guiding said slide members, said guide channel portions having longitudinal curvatures substantially equal to respective curvatures of the front and rear end edges of the door glass in the longitudinal section thereof.

2. A construction of a door glass guide in a motor vehicle as set forth in claim 1, wherein said spherical head portion of the slide member projects inwardly from the door glass, and said guide groove of the guide channel portion opens outwardly in the widthwise direction of the vehicle body.

3. A construction of a door glass guide in a motor vehicle as set forth in claim 1, wherein one slide member is mounted to a position close to the upper end portion of the front end edge of the door glass and a pair of slide members are mounted to the upper end portion of the rear end edge and a lower end portion of the rear end edge of the door glass, respectively.

4. A construction of a door glass guide in a motor vehicle as set forth in claim 1, wherein each of said guide channel portions has a generally elliptic, elongated guide groove for incorporating therein the spherical head portion of the slide member and restraining the same in the transverse direction of the door glass.

5. A construction of a door glass guide in a motor vehicle as set forth in claim 4, wherein said spherical head portion of the slide member projects inwardly from the door glass, and said guide groove of the guide channel portion opens outwardly in the widthwise direction of the vehicle body.

6. A construction of a door glass guide in a motor vehicle as set forth in claim 4, wherein one slide member is mounted to a position close to the upper end portion of the front end edge of the door glass and a pair of slide members are mounted to the upper end portion of the rear end edge and a lower end portion of the rear end edge of the door glass, respectively.

7. A construction of a door glass guide in a motor vehicle as set forth in claim 1, wherein said slide members each are provided with a mounting seat contacting the inner surface of the door glass when the slide member is tightened and fixed to the door glass for mounting, and a connecting shaft portion connecting the spherical head portion to the mounting seat.

8. A construction of a door glass guide in a motor vehicle as set forth in claim 7, wherein said connecting shaft portion of the slide member is perpendicularly bent along the inner surface of the door glass, said spherical head portion is mounted to a forward end of the connecting shaft portion, and the guide channel portion is opposed to this spherical head portion.

9. A construction of a door glass guide in a motor vehicle as set forth in claim 7, wherein one slide member is mounted to a position close to the upper end portion of the front end edge of the door glass and a pair of slide members are mounted to the upper end portion of the rear end edge and a lower end portion of the rear end edge of the door glass, respectively.

10. A construction of a door glass guide in a motor vehicle as set forth in claim 7, wherein said spherical head portion of the slide member projects inwardly from the door glass, and said guide groove of the guide channel portion opens outwardly in the widthwise direction of the vehicle body.

11. A construction of a door glass guide in a motor vehicle as set forth in claim 10, wherein said connecting shaft portion of the slide member is perpendicularly bent along the inner surface of the door glass, said spherical head portion is mounted to a forward end of the connecting shaft portion, and the guide channel portion is opposed to this spherical head portion.

12. A construction of a door glass guide in a motor vehicle as set forth in claim 7, wherein each of said guide channel portions has a generally elliptic, elongated guide groove for incorporating therein the spherical head portion of the slide member and restraining the same in the transverse direction of the door glass.

13. A construction of a door glass guide in a motor vehicle as set forth in claim 12, wherein said connecting shaft portion of the slide member is perpendicularly bent along the inner surface of the door glass, said spherical head portion is mounted to a forward end of the connecting shaft portion, and the guide channel portion is opposed to this spherical head portion.

14. A construction of a door glass guide in a motor vehicle as set forth in claim 12, wherein one slide member is mounted to a position close to the upper end portion of the front end edge of the door glass and a pair of slide members are mounted to the upper end portion of the rear end edge and a lower end portion of the rear end edge of the door glass, respectively.

15. A construction of a door glass guide in a motor vehicle as set forth in claim 12, wherein said spherical head portion of the slide member projects inwardly from the door glass, and said guide groove of the guide channel portion opens outwardly in the widthwise direction of the vehicle body.

16. A construction of a door glass guide in a motor vehicle as set forth in claim 15, wherein said connecting shaft portion of the slide member is perpendiculary bent along the inner surface of the door glass, said spherical head portion is mounted to a forward end of the connecting shaft portion, and the guide channel portion is opposed to this spherical head portion.

17. A construction of a door glass guide in a motor vehicle as set forth in claim 12, wherein said guide groove has an opening therethrough and the connecting shaft portion of the slide member extends through said opening, and said opening has a width permitting the slide member to rock about the spherical head portion thereof in said guide groove within a predetermined range.

18. A construction of a door glass guide in a motor vehicle as set forth in claim 17, wherein one slide member is mounted to a position close to the upper end portion of the front end edge of the door glass and a pair of slide members are mounted to the upper end portion of the rear end edge and a lower end portion of the rear end edge of the door glass, respectively.

19. A construction of a door glass guide in a motor vehicle as set forth in claim 17, wherein said spherical head portion of the slide member projects inwardly from the door glass, and said guide groove of the guide channel portion opens outwardly in the widthwise direction of the vehicle body.

20. A construction of a door glass guide in a motor vehicle as set forth in claim 19, wherein said connecting shaft portion of the slide member is perpendicularly bent along the inner surface of the door glass, said spherical head portion is mounted to a forward end of the connecting shaft portion, and the guide channel portion is opposed to this spherical head portion.

* * * * *